EJECTION SEAT HAVING LEG BOOSTERS
Filed April 18, 1955 3 Sheets-Sheet 1
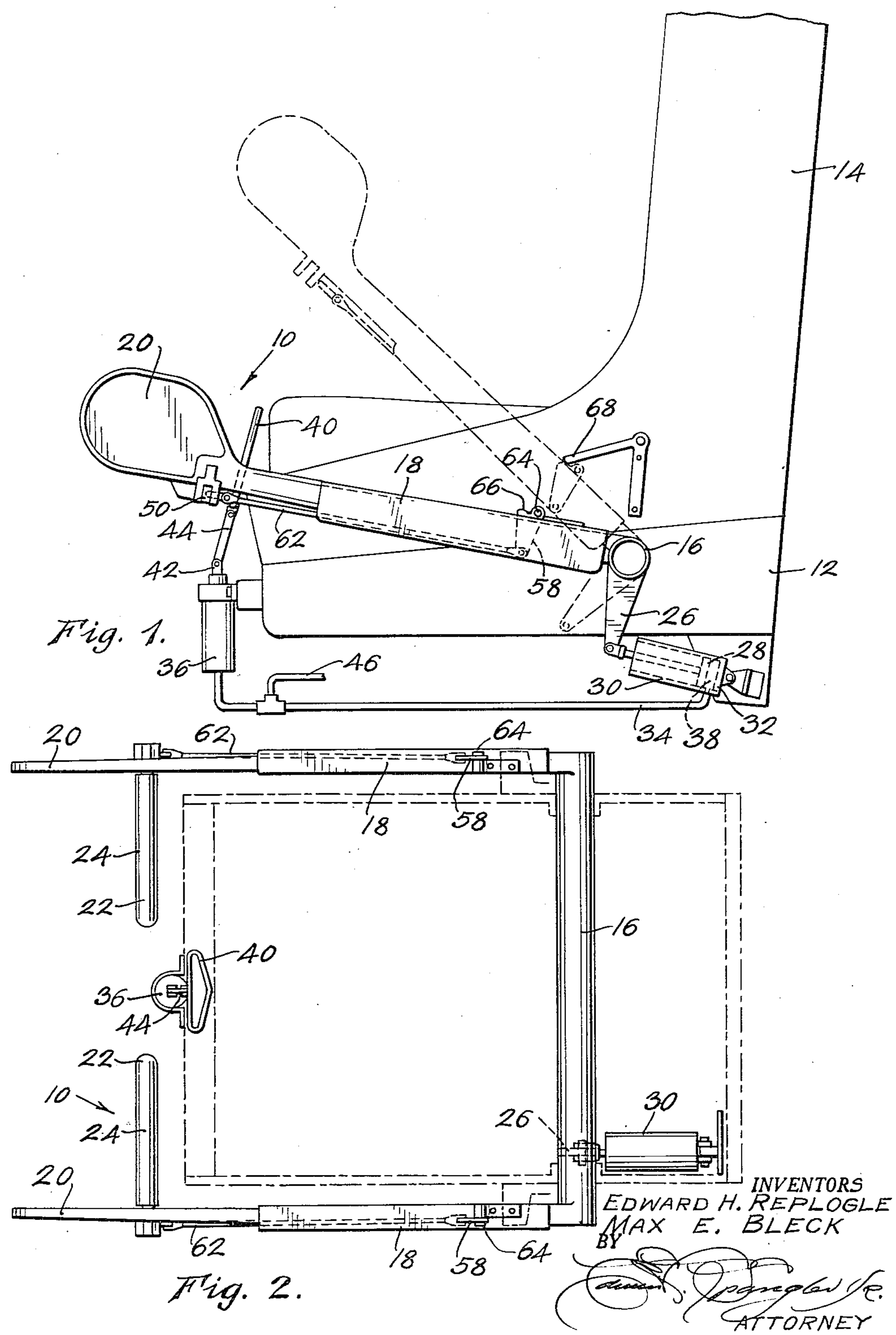
INVENTORS
EDWARD H. REPLOGLE
MAX E. BLECK
BY
ATTORNEY

EJECTION SEAT HAVING LEG BOOSTERS

INVENTORS
EDWARD H. REPLOGLE
MAX E. BLECK
BY
ATTORNEY

Oct. 2, 1956 E. H. REPLOGLE ET AL 2,765,130

EJECTION SEAT HAVING LEG BOOSTERS

Filed April 18, 1955 3 Sheets-Sheet 3

INVENTORS
EDWARD H. REPLOGLE
MAX E. BLECK
BY
ATTORNEY

United States Patent Office 2,765,130
Patented Oct. 2, 1956

2,765,130

EJECTION SEAT HAVING LEG BOOSTERS

Edward H. Replogle, Snyder, N. Y., and Max E. Bleck, Aurora, Colo., assignors to Stanley Aviation Corporation, Buffalo, N. Y., a corporation of New York Application April 18, 1955, Serial No. 501,838

7 Claims. (Cl. 244—122)

This invention relates to safety devices for use with aircraft escape mechanisms; and more particularly, to leg boosters for use in combination with aircraft ejection seats.

The up-to-date, high speed military airplane is customarily equipped with escape devices by means of which the pilot and crew may escape from the airplane in an emergency. The high degree of mental and physical strain on the pilot and crew in an emergency, along with the need for speed in making their escape, renders it imperative that the plane be provided with every reasonable safety device to aid them in their escape. Insofar as is practicable, the safety devices should operate automatically, or at least operate after one or two simple functions are performed which put into motion all the interrelated mechanisms necessary for a safe ejection from the plane. Furthermore, as little as possible must be left to the judgment of the pilot and crew as they may be injured and will certainly be under extreme emotional strain so that their judgment cannot be relied upon.

The cockpit and crew stations are crowded with equipment and the escape hatch is barely large enough to pass the man and seat from the plane under ideal conditions. The pilot, for instance, during normal flight will have his legs extended in front of him on the rudder pedals. With his legs extended the pilot would not be able to clear the escape hatch without serious injury. It is necessary, therefore, for the pilot and crew members to pull back their legs into a position where their feet rest on the foot rests carried by the seat bucket prior to ejection. The seat occupant's arms usually assume the correct position when he grasps the D-ring to initiate the ejection cycle. Heretofore, however, the occupant of the seat was required to place his legs in the correct position for ejection without the aid of any safety device. The leg booster of the present invention lifts the legs of the pilot or crew member into the correct position for ejection as he performs the pre-ejection functions.

As soon as the leg booster has lifted the pilot or crew member's legs into the correct position for ejection all restraint thus placed on their legs must be removed so that they may separate from the seat after ejection.

The leg booster of the present invention also incorporates an additional safety feature which provides a guard alongside the legs of the seat occupant which prevents them from being spread apart due to the action of the slipstream thereon when the ejection seat leaves the plane.

It is, therefore, the principal object of the present invention to provide a leg booster for use in combination with an aircraft ejection seat which will engage and place the legs of the pilot or crew member in a safe position for ejection upon the performance of a single simple manual operation.

A second object of the leg booster of the present invention is the provision of leg guards which prevent the seat occupant's legs from being spread apart by the slipstream as he leaves the plane.

Another object of the invention is the provision of means whereby the legs are automatically released from the leg booster to permit separation from the seat as soon as the legs have been placed in a safe position for ejection.

Other objects of the present invention are the provision of a leg booster which is lightweight, compact, and adaptable for use with many different types and designs of aircraft escape equipment.

Other objects will be in part apparent and in part pointed out specifically hereinafter in connection with the description of the drawing which follows; and in which:

Figure 1 is a side elevation of an ejection seat showing the leg booster of the present invention carried by the seat bucket with the inoperative position thereof indicated by full lines and the operative position shown by dotted lines;

Figure 2 is a top plan view of the leg booster of the present invention with the ejection seat indicated by dotted lines;

Figure 3:
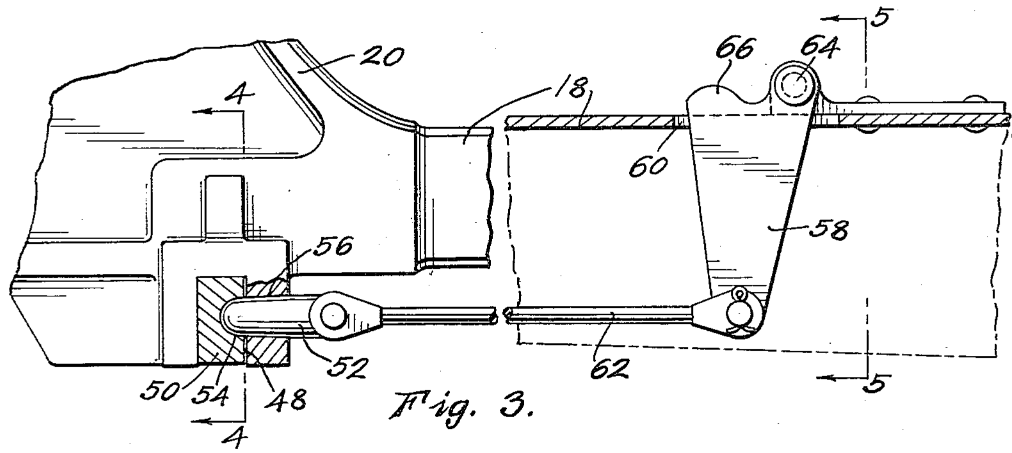
Figure 3 is an enlarged fragmentary view of the automatic disconnect means for releasing the leg engaging elements, portions of this view having been broken away to conserve space and better show the construction.
Figure 4:
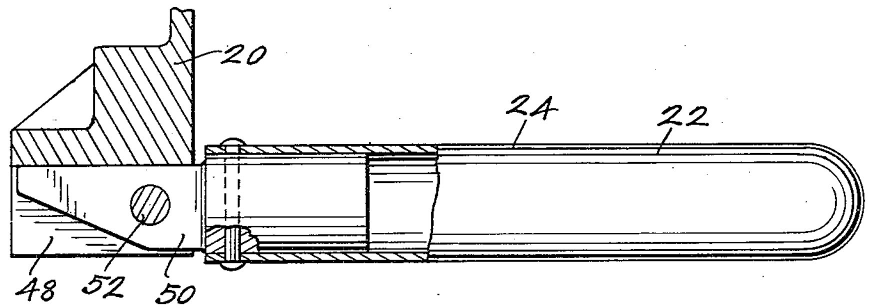
Figure 4 is a view taken along line 4—4 of Figure 3 with portions thereof broken away to show the internal construction.
Figure 5:
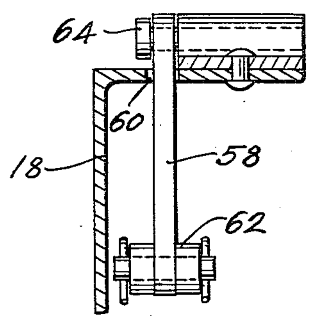
Figure 5 is a view taken along line 5—5 of Figure 3.

Referring now to Figures 1 and 2 of the drawing, it will be seen that the leg booster 10 is carried by the base 12 of an aircraft ejection seat 14. No attempt has been made to illustrate the conventional propulsion means by which the seat is ejected from the aircraft as these means are well known to those skilled in the art and form no part of the present invention. A shaft 16 is mounted for rotation in the base and extends transversely with respect thereto. The ends of the shaft extend beyond the sides of the seat and two lifting arms 18 extend forwardly from the ends of the shaft along the sides. The arms are substantially parallel to one another and rigidly connected to the ends of the shaft so that rotational movement of the shaft will cause the lifting arms to be raised and lowered. The forward ends of each arm are provided with leg guards 20. Leg engaging means 22 are carried by the lifting arms in position to engage the legs of the seat occupant behind the knees when the arms 18 are raised. The particular leg engaging means illustrated in Figures 2 and 4 comprise separate leg engaging elements 24 substantially aligned with one another but having the inner ends thereof spaced apart to form an unobstructed area between the seat occupant's legs. A lever arm 26 is rigidly attached to the shaft 16 and is, in turn, connected to the piston 28 of thruster 30. The thruster is mounted on the ejection seat and positioned to act through lever arm 26 to rotate shaft 16 and raise lifting arms 18 into the dotted line position shown in Figure 1 as the piston moves away from cylinder head 32 of the thruster. A gas line 34 interconnects initiator 36 and the space 38 between the piston and the cylinder head of the thruster. D-ring 40 is connected to the firing pin 42 of the initiator by link 44. The initiator 36 is of the conventional gas or ballistically operated type which when fired will create a gas pressure in gas line 34 thereby forcing piston 28 away from the cylinder head 32 of the thruster. Gas line 34 is provided with a branch line 46 so that the gas pressure created by the initiator may be used to operate other devices required for safe ejection from the aircraft.

In connection with Figures 1 through 5, inclusive, of the drawing it will be seen that the forward ends of the lifting arms 18 are provided with a transverse groove 48 opening downwardly. The outer ends 50 of the leg engaging means 22 are adapted to fit into grooves 48. The leg engaging elements 24 are held in the grooves by means of tapered pin 52 which fits into socket 54 of said elements. The pin is carried in opening 56 of arms 18 which open into the groove and register with the socket in the leg engaging elements. A crank arm 58 is mounted for pivotal movement in slot 60 in the lifting arms 18. A link 62 interconnects the pins and the crank arm at a point spaced from the pivot 64. Crank arm 58 forms a bell crank which rotates about pivot 64 and causes the pin to be withdrawn from the socket in the leg engaging elements as portion 66 thereof engages stop 68, shown in Figure 1, attached to the side of the ejection seat. When pin 52 is withdrawn from the socket in the outer end of the leg engaging elements said elements are free to drop out of groove 48. Stop 68 also limits the upward movement of lifting arms 18 and stops them in a position where the leg guards protect the legs of the seat occupant.

In order to operate the leg booster of the present invention the seat occupant merely pulls upon the D-ring until the firing pin to which it is connected fires the initiator. The gas pressure created in the thruster by the initiator forces the piston away from the cylinder head thus acting upon lever arm 26 to rotate the shaft and raise the arms of the leg booster. As the lifting arms move upward the leg engaging elements engage the seat occupant's legs behind the knees and move them toward his chest thus tucking them in close to the body. The leg engaging means, having served their function to correctly position the pilot's legs for ejection, are no longer needed; and in fact, must either be removed or placed in a position where they will not interfere with the occupant as he attempts to separate from the seat after ejection. This is accomplished by the automatic disconnect means operable by the stop attached to the ejection seat. The stop engages portion 66 of bell crank type crank arm 58 which is then rotated about pivot 64 to effect withdrawal of the tapered pin from the socket in the leg engaging elements. The leg engaging elements are then free to drop out of the groove in the lifting arms thus enabling the occupant of the seat to readily separate therefrom after ejection from the plane. The lifting arms of the leg booster, however, remain in the dotted line position shown in Figure 1 with the leg guards positioned alongside the knees of the seat occupant.

Figures 6, 7:
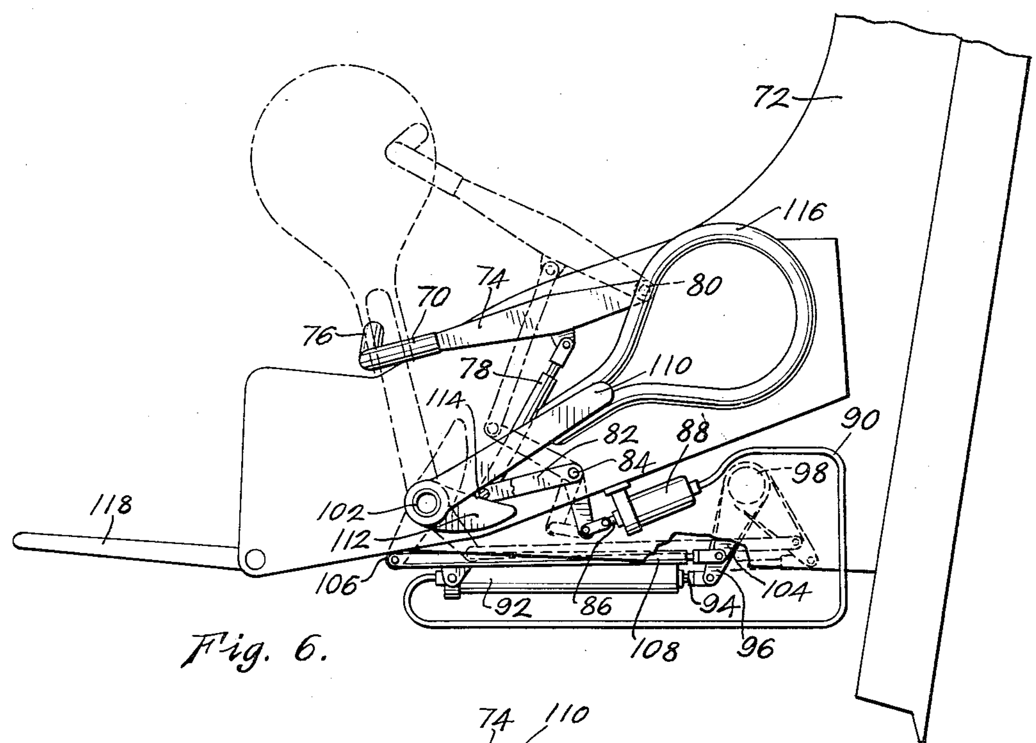
Figure 6 is a side elevation showing a modified form of the leg booster of the present invention carried by an ejection seat; and, Figure 7 is a top plan view of the modified leg booster with the ejection seat indicated by dotted lines.

A modified form of the leg booster of the present invention will now be described in connection with Figures 6 and 7 of the drawing. A substantially U-shaped leg engaging means 70 is attached to the sides of the ejection seat 72 for pivotal movement. The side arms 74 of the leg engaging means extend forwardly alongside the seat and the cross arm 76 extends transversely between the side arms and underneath the seat occupant's legs behind his knees. One end of link 78 is attached to one of the side arms between the pivot 80 and the cross arm 76. The other end of link 78 is attached to one arm of bell crank 82 which is mounted for pivotal movement on pivot 84 affixed to the side of the seat. The other arm of bell crank 82 is attached to firing pin 86 of initiator 88. A gas line 90 interconnects the initiator and thruster 92. The piston rod 94 of the thruster is connected to lever arm 96 which is rigidly connected to jack shaft 98. Jack shaft 98 is mounted for rotational movement within bearings 100 carried by the seat. Rotational movement of jack shaft 98 is transferred to shaft 102 by means of lever arms 104 and 106 and connecting rod 108. Shaft 102 is mounted for rotational movement in the forward end of the seat with the ends of the shaft extending beyond the sides of the seat. Two lifting arms 110 are attached to the ends of the shaft and extend rearwardly along the sides of the seat. A cam 112 is carried by the shaft in position to engage the underside of pin 114 interconnecting link 78 and bell crank 82. Cam 112 is positioned with respect to link 78 and bell crank 82 such that rotation of shaft 102 will cause the cam to act upon pin 114 and raise the leg engaging means 70 to the dotted line operative position shown in Figure 6. Rotation of shaft 102 also rotates lifting arms 110 to the dotted line operative position of Figure 6 thereby positioning leg guards 116 attached to lifting arms 110 alongside the knees of the seat occupant. As the U-shaped leg engaging means move upward into the dotted line position by reason of cam 112 acting upon pin 114, the cross arm engages the legs of the seat occupant and tucks them in against his body thereby placing his feet upon foot rests 118 which is a safe position for ejection. Cam 112 is shaped so that pin 114 will run off the end thereof just before lifting arms 110 reach the dotted line operative position which permits the U-shaped leg engaging means 70 to return to the full line inoperative position shown in Figure 6. Thus, the leg engaging means fall immediately to their original position as soon as their function of placing the seat occupant's legs upon the foot rests has been completed. The cross arm in the inoperative position will not interfere with the pilot as he attempts to separate from the seat following ejection from the aircraft. Lifting arms 110 and leg guards 116, however, remain in the operative position to prevent the seat occupant's legs from being spread apart by the slipstream.

The operation of the leg booster of Figures 6 and 7 will now be described. The leg booster is triggered by grasping cross arm 76 and raising it a short distance. This movement acts through link 78 and bell crank 82 to pull the firing pin 86 and fire the initiator 88. The gas pressure carried to the thruster through gas line 90 forces piston rod 94 out of the thruster causing lever arm 96 to move from the full line position to the dotted line position shown in Figure 6. Jack shaft 98 is rotated thereby and causes shaft 102 to rotate by reason of lever arms 104 and 106 and connecting rod 108. Rotation of shaft 102 causes cam 112 to rotate to the dotted line position and raise pin 114. As pin 114 moves upward it also forces the U-shaped leg engaging means upward. Pin 114, however, overrides the end of cam 112 before the cam reaches the dotted line position thus permitting the leg engaging means to return to its initial inoperative position. Rotation of shaft 102 moves lifting arms 110 and leg guards 116 from their inoperative position alongside the seat to the dotted line operative position of Figure 6 where they remain to protect the pilot's legs from the spreading effect of the slipstream.

From the foregoing description of the leg booster of the present invention in combination with an aircraft ejection seat it can be seen that the many useful objects for which it was designed have been achieved; and therefore, we claim:

1. In combination: an ejection seat positioned to be jettisoned from an aircraft; and, a leg booster carried by the seat for raising the legs of an occupant of the seat into a safe position for ejection, said leg booster comprising, leg engaging means positioned below and behind the knees of an occupant of the seat, lifting means operatively interconnecting the leg engaging means and the seat for raising the leg engaging means relative to the seat, power supply means connected to the lifting means for operating the same to raise the leg engaging means, and means for automatically disconnecting the leg engaging means from the lifting means when said means are in the raised position.

2. In combination: an ejection seat positioned to be jettisoned from an aircraft; a leg booster carried by the seat for raising the legs of an occupant of the seat into a safe position for ejection, said leg booster comprising, leg engaging means positioned below and behind the knees of an occupant of the seat, lifting means operatively interconnecting the leg engaging means and the seat for raising the leg engaging means relative to the seat, and power supply means connected to the lifting means for operating the same to raise the leg engaging means; and, leg guards operatively connected to the lifting means for movement into position on opposite sides of the legs of an occupant of the seat when the lifting means operate to raise the leg engaging means.

3. In combination: an ejection seat positioned to be jettisoned from an aircraft; a leg booster carried by the seat for raising the legs of an occupant of the seat into a safe position for ejection, said leg booster comprising, leg engaging means positioned below and behind the knees of an occupant of the seat, lifting means operatively interconnecting the leg engaging means and the seat for raising the leg engaging means relative to the seat, power supply means connected to the lifting means for operating the same to raise the leg engaging means, and means for releasing the legs of an occupant of the seat from the leg engaging means in the raised position; and, leg guards carried by the lifting means into position on opposite sides of the legs of an occupant of the seat when the lifting means operate to raise the leg engaging means.

4. In combination: an ejection seat positioned to be jettisoned from an aircraft; and, a leg booster carried by the seat for raising the legs of an occupant of the seat into a safe position for ejection, said leg booster comprising, leg engaging means positioned below and behind the knees of an occupant of the seat, two substantially parallel lifting arms connected to the leg engaging means and extending rearwardly therefrom along opposite sides of the seat to a point of pivotal connection with the seat, power supply means connected to the lifting arms for pivoting the arms upward about their axis of pivotation, and means for releasing the legs of an occupant of the seat from the leg engaging means in the raised position.

5. In combination: an ejection seat positioned to be jettisoned from an aircraft; and, a leg booster carried by the seat for raising the legs of an occupant of the seat into a safe position for ejection, said leg booster comprising, a shaft carried between opposite sides of the seat for rotational movement, two substantially parallel lifting arms fixedly attached to opposite ends of the shaft and extending forwardly along opposite sides of the seat, leg engaging means attached to the forward ends of the lifting arms and extending transversely therebetween below and behind the knees of an occupant of the seat, and means operatively connected to the shaft for rotating the same to raise the leg engaging means and the lifting arms into a position where the leg engaging means have engaged and lifted the legs of an occupant of the seat into a safe attitude for ejection from the aircraft.

6. In combination: an ejection seat positioned to be jettisoned from an aircraft; a leg booster carried by the seat for raising the legs of an occupant of the seat into a safe position for ejection, said leg booster comprising, a shaft carried between the sides of the seat for rotational movement, two substantially parallel lifting arms fixedly attached to opposite ends of the shaft and extending forwardly along opposite sides of the seat, a leg engaging element attached to the forward ends of each lifting arm and extending transversely with respect thereto below and beneath the adjacent knee of an occupant of the seat, means operatively connected to the shaft for rotating the same to raise the lifting arms and the leg engaging elements thereby lifting the legs of an occupant of the seat into a safe position for ejection, and means for automatically disconnecting each leg engaging element from the corresponding lifting arm when said elements reach the raised position; and, leg guards carried by the forward ends of the lifting arms into position on opposite sides of the legs of an occupant of the seat when the lifting arms are raised.

7. In combination: an ejection seat positioned to be jettisoned from an aircraft; a leg booster carried by the seat for raising the legs of an occupant of the seat into a safe position for ejection, said leg booster comprising, a shaft carried between opposite sides of the seat for rotational movement, two substantially parallel lifting arms fixedly attached to opposite ends of the shaft and extending rearwardly along opposite sides of the seat, leg guards carried on the rear ends of the lifting arms movable into position on opposite sides of the legs of an occupant of the seat upon rotational movement of the shaft, means connected to the shaft for rotating the same to raise the lifting arms and leg guards, leg engaging means positioned below and behind the knees of an occupant of the seat, two substantially parallel side arms connected to the leg engaging means and extending rearwardly therefrom along opposite sides of the seat to a point of pivotal connection with the seat, and means interconnecting the lifting arms and the side arms whereby the leg engaging means and side arms will be raised simultaneously with the lifting arms upon rotational movement of the shaft.

References Cited in the file of this patent

UNITED STATES PATENTS

| | | |
|---|---|---|
| 2,528,532 | Martin | Nov. 7, 1950 |
| 2,689,697 | Stanley | Sept. 21, 1954 |
| 2,709,557 | Replogle | May 31, 1955 |

FOREIGN PATENTS

| | | |
|---|---|---|
| 19,652 | Great Britain | of 1898 |